Jan. 31, 1950   L. M. VAN DAELE ET AL   2,495,791
SYSTEM FOR THE PROTECTION OF TRANSMISSION
LINES USING ALTERNATING CURRENTS
Filed Feb. 26, 1947

*INVENTOR.*
LEON MARIE VAN DAELE
JAN JOZEF BALLET
BY
*Robert Harding*
ATTORNEY

Patented Jan. 31, 1950

2,495,791

UNITED STATES PATENT OFFICE 2,495,791

SYSTEM FOR THE PROTECTION OF TRANSMISSION LINES USING ALTERNATING CURRENTS

Leon Marie Van Daele and Jan Joseph Ballet, Antwerp, Belgium

Application February 26, 1947, Serial No. 731,140 In the Netherlands April 26, 1940

Section 1, Public Law 690, August 8, 1946 Patent expires April 26, 1960

8 Claims. (Cl. 171—97)

The invention relates to systems of transmission lines and more particularly to a system for the protection of transmission lines wherein a relatively low current flow makes safety fuses and automatic devices impracticable.

An object of the invention is the provision of protecting means which is substantially similar to that furnished by safety fuses or automatic devices, but which can be utilized in cases and under circumstances when the use of safety fuses or automatic devices is impracticable or undesirable. More specifically, the invention provides a protecting system which will limit the maximum current that flows in a shorted circuit where otherwise such a short circuit in one of the parts of a system would put the entire system out of service.

Another object of the invention is the provision of a system which can be operated by currents of such low intensity that the utilization of safety fuses or automatic devices would prove troublesome, expensive, inadequate and generally undesirable.

A further object of the invention is the provision of a line protecting system that is self-restoring; that is, a system in which the branch or branches ordinarily put out of service by a short circuit are directly restored to the operative condition on the disappearance of such a short circuit.

Another object of the invention is the provision of a protective system which has no movable parts and which requires no maintenance or replacement of parts.

A further object of the invention is to provide in systems of this kind receiving devices that in themselves form part of the required impedances of the protective arrangement.

Another object of the invention is the provision of a system that will transmit direct current energy as well as alternating current energy from the source to the receiving units.

Other and further objects may be and may become apparent to those skilled in the art from a perusal of the disclosure of this invention without departing from the spirit of the subjoined claims.

For a better understanding of the invention, reference may be had to the accompanying drawings.

Figure 1:
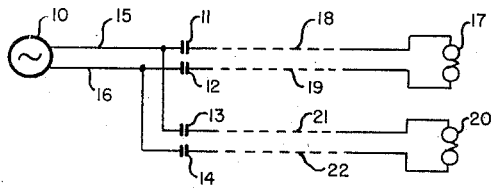
Fig. 1 illustrates a simple embodiment of the invention for alternating current transmission.

Referring to Fig. 1 there is shown a source of alternating current 10 connected to one side of the condensers 11, 12, 13, and 14, respectively, by feed lines 15 and 16. The second plate of the condenser 11 is connected to a receiving device, for example, an electric bell 17, by a line 18 and the second plate of the condenser 12 is also connected to the bell 17 by a line 19. The second plate of the condenser 13 is connected to a second electric bell 20 by a line 21 and the second plate of the condenser 14 is also connected to the bell 20 by a line 22.

Figure 2:
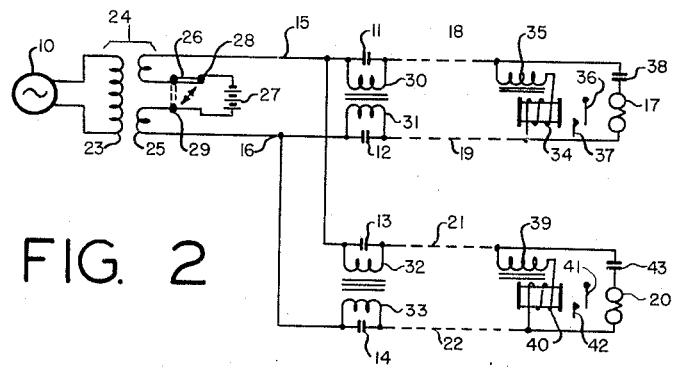
Fig. 2 illustrates another embodiment of the invention which is suitable for the transmission of direct current in series or loop connection.

In Fig. 2 the parts and circuits that are similar to those of Fig. 1 have the same reference numbers. In this case the alternating current source 10 is connected to the primary winding 23 of a transformer 24. The secondary winding 25 is serially connected at the midsection by a single-pole, double-throw switch 26 and a battery 27. It will be seen that if the single-pole, double-throw switch 26 is abutting the contact 28 a direct current potential will be placed in series with the lines 15 and 16 and if the switch 26 is abutting the contact 29, the direct current source will be cut out of the circuit and there will be only an alternating current placed onto the secondary winding 25 and hence in the lines 15 and 16. There is connected in parallel with each of the condensers 11, 12, 13, and 14, a choke coil, 30, 31, 32, and 33, respectively, in order that the direct current may flow around the condensers but will impede the flow of alternating current. On the other hand, the condensers will pass an alternating current but will impede the flow of the direct current. A relay 34 is serially connected with a choke coil 35 and they are connected across the lines 18 and 19. The choke 35 serves to allow only the direct current to actuate the relay 34 and hence open or close an armature 36 with a contact 37 to control an external circuit. A high capacitance condenser 38 is serially connected in the line 18 between the line side of the choke 35 and the electric bell 17 to allow passage of the alternating current to operate the bell 17 and impede the flow of the direct current through the bell 17.

On the second control circuit, a choke 39 and a relay 40 are connected in parallel across the lines 21 and 22 and actuate an armature 41 in conjunction with a contact 42 to control a second external direct current control circuit. A condenser 43 is serially connected in the line 21 between the line side of the choke 39 and the bell 20 to pass A. C. and impede the D. C. for operation of the bell 20.

Figure 3:
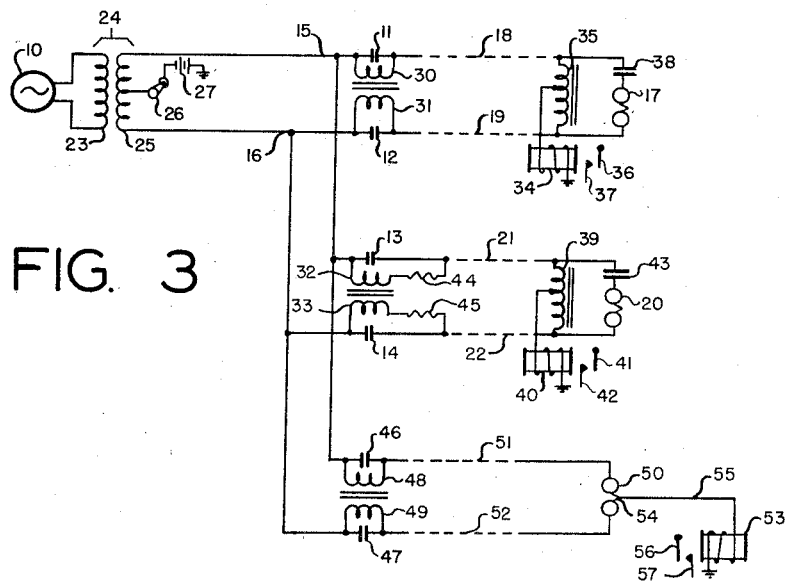
Fig. 3 illustrates another embodiment of the invention which is suitable for the transmission of direct current in parallel or simplex connection.

In Fig. 3 the similar parts and circuits shown in Figs. 1 and 2 have the same reference numbers. In this case, the direct current source 27 is connected to the center tap of the transformer secondary 25 through the switch 26 to ground, indicated by the conventional symbol for a "ground." The choke coils 35 and 39 are connected across the lines 18—19 and the lines 21—22 respectively, and the relays 34 and 40 are connected to the mid-taps of the choke coils 35 and 39 respectively and the other ends of the relay winding are connected to ground. The chokes 32 and 33 have resistors 44 and 45 respectively connected in series with them across their respective condensers 13 and 14. A third controlled circuit is shown connected to lines 15 and 16 through condensers 46 and 47 and these condensers are parallelled by choke coils 48 and 49, respectively, which in turn connect to an electric bell 50 by lines 51 and 52. A relay 53 is serially connected between the ground and a mid-tap 54 by a lead 55. This relay operates an armature 56 in conjunction with a contact 57 to control an external circuit.

In operation, an alternating current source 10 for a 50-cycle current is connected to a common feed line 15 and 16 and to a number of individual transmission lines 18—19 and 21—22 which in turn operate, for example, remotely located electric bells 17 and 20. The system according to the invention presents special advantages when the two transmission lines 18—19 and 21—22 are particularly susceptible to short circuits, either through being more than usually exposed to them or because these lines have a greater combined length than the rest of the system's wiring, thus increasing the possibility of short circuits occurring.

It is assumed that in the illustrated embodiments the receiving devices 17 and 20 are electric bells of the same kind as ordinarily used in telephone circuits and that the electromagnetic windings have a relatively high impedance. Bell windings of this kind have a certain amount of self-inductance and according to one characteristic feature of the invention each pair of condensers 11 and 12 or 13 and 14 are of such a value that they are in resonance with the inductive reactance of the corresponding bell. In experimentation with a particular embodiment of the invention, it was found that each of the bells 17 and 20 was wound in such a way that it had a D. C. resistance of 2500 ohms, while the effective impedance at 50 cycles amounted to approximately 16,000 ohms. The condensers 11 and 12 or 13 and 14 each possessed a capacity of 0.4 microfarad resulting in a combined capacitive reactance of approximately 16,000 ohms. In each of the circuits the condensers 12 and 14 may be omitted and the condensers 11 and 13 must have a capacity of 0.2 microfarad in order to have a capacitive reactance of 16,000 ohms in each circuit.

Since the inductive and the capacitive reactances of 16,000 ohms cancel, the resultant total impedance of the circuit of bell 17 or 20, as seen from the source 10, will be the ohmic resistance 2500 ohms (neglecting the impedance of the transmission line itself) when conditions are normal, that is when no short circuit exists on the line. As soon as, however, such a short circuit develops, the full capacitive reactance of 16,000 ohms represented by condensers 11, 12 (or 13, 14) will become effective, thus limiting the flow of current from the source 10 through the short-circuited line and preventing the useless dissipation of a large amount of energy while at the same time insuring that the voltage available to the other transmission line, which has not been short-circuited, be not reduced below a predetermined value.

Fig. 2 represents, in general, a similar system which is equipped to operate simultaneously with direct current and alternating current. In this embodiment the alternating current source 10 is coupled to the feed line 15 and 16 by the transformer 24 and the battery 27 is serially connected in the secondary winding 25. The switch 26 disconnects the battery 27 and closes the secondary circuit 25 of the transformer 24, thereby restoring the continuity of the A. C. circuit. Two choke coils 30 and 31 are located parallel to the condensers 11 and 12 and permit passage of direct current.

These choke coils are of such value that the direct current flowing therethrough may saturate the coils only to such extent that their self-induction is not destroyed. The two choke coils 30 and 31 of the first transmission line or the two choke coils 32 and 33 of the second transmission line may be separate or may be wound on a common core.

At the receiving end of each transmission line, a large condenser 38 is connected in series with the bell 17 in order to prevent the passage of direct current and thereby prevent the direct current from operating the bell 17, but provide an alternating current path to operate the bell 17. The choke coil 35 and the relay 34 which are connected in parallel across the transmission lines 18 and 19 provide an impedance to the alternating current but provide a path for the direct current to operate the relay 34 which in turn controls an external circuit. If the choke coils 30, 31, and 35 have a very high alternating current reactance and the condenser 38 has just a negligible alternating current reactance, the design of the bell winding 17 and of the condensers 11 and 12 may be practically the same as explained for Fig. 1. It is to be understood that the operation of the bell 20 and the relay 40 and the associated components in the second transmission line are the same as in the case of the bell 17 and the relay 34 in the first transmission line and that a plurality of such transmission lines may be used without departing from the scope of the invention.

Fig. 3 illustrates a third embodiment of the invention, in which the direct current is transmitted in parallel connection. In this figure the battery 27 is connected to the ground by the switch 26 from a central tapping point on the secondary winding 25 of the transformer 24 and at the direct current control end of the transmission line 18 and 19 the D. C. relay 34 is connected to earth from a central tap on the choke coil 35. In this way the direct current flows through the two halves of the choke coil winding, thereby preventing any tendency to destroy the A. C. impedance of this choke coil by saturation. In this embodiment the two choke coils 30 and 31 are to be preferably wound on a single core, so that the direct current that flows through the two windings may neutralize each other's magnetic effects, thereby producing saturation and a lessening of the A. C. impedance resulting therefrom.

Referring to the second branch transmission line of Fig. 3, if the D. C. resistance of the choke coils 32 and 33 is of a nominal value as described for those of Fig. 2, the resistance of such coils will limit, to a certain degree, the flow of D. C. in case of a short circuit of another or corresponding transmission line. A D. C. protection of this kind against an overload cannot be as complete as the corresponding A. C. protection that is provided according to the invention, for there is no way of preventing the D. C. that is received during the short circuit condition from being somewhat greater than that which is received during normal working conditions. If, however, the resistance of the choke coils 32 and 33 is considerably greater than the resistance of the lines 21 and 22, the choke coil 39 and the relay 40, the increase of current upon the occurrence of a short circuit may be brought down to a practical value. If it is not desired to leave a sufficiently high direct current resistance in the choke coils 32 and 33 themselves, external resistances 44 and 45 may, in this case, be connected in series with the choke coils 32 and 33.

In the third transmission line shown at the bottom of Fig. 3, the electromagnetic winding 54 of the bell 50 may be used in place of the choke coil 39 as shown in the second transmission line, by tapping the winding 54 at the mid-point and serially connecting the D. C. relay 53 to ground.

Suitable values for the arrangement shown in Fig. 3 are as follows: 0.5 microfarad for each of the condensers 15 and 14; for each of the choke coils (32 and 33) 100 henrys with an internal resistance of approximately 3000 ohms each or with external resistances 44 and 45 of 3000 ohms each, and for the choke coil 39 a total of 180 henrys with a resistance of 1 to 200 ohms; for relay 40 a negligible resistance compared with that of 39 and with a resistance of only a few hundred ohms; for condenser 43, 2 microfarads, and for bell 20, 16,000 ohms impedance at 50 cycles.

It is clear that if the consuming device is not of itself reactive, a suitable reactance can be connected to it in series or in shunt. If, for example, the consuming device has only ohmic resistance, this may be connected in series with a condenser and then one or more self-inductances are connected in series with one or both sides of the line close to the end facing the source. This results in a connection arrangement which is very similar to that of Fig. 1, but in which self-inductances are used instead of the condensers 11 and 12 and in which only a combination of a capacity and a resistance is installed in place of the bell 17.

Various other combinations may also be made, but in all these cases the effective reactance at the consuming end of each line must be of opposite phase to the reactance at the end of the line where the source is located, and these reactances must preferably be selected almost in resonance with each other in order to insure that the current which is received under operating conditions is substantially the same as that which is received under short circuit conditions. It is, however, preferable to adapt the invention to systems having inductive consuming devices and to utilize the inherent self-induction of the same, as an element of the protection connection arrangement in the manner indicated in Figs. 1, 2, and 3.

The invention offers special advantages for signaling connection arrangements, because the weak currents that are generally used in signal systems are exceptionally difficult to protect by safety fuses or automatic devices of the customary type.

Although the invention is primarily intended for systems in which a single source feeds a number of loads over separate lines, of which at least one is exposed to the risk of being short circuited, the invention can likewise be used in a system where a number of sources are all connected to a single receiving device, e. g., for the sending of alarms or the like. Fig. 1 may be regarded as an example of a system of this kind in which the elements 17 then represent the individual sources, while the element 10 indicates the common alarm receiver. Utilization of the invention in a system of this kind insures that a short circuit in one of the feed lines (e. g. the top one in Fig. 1, when the system is installed in the manner just described) will not prevent an alarm from being sent out over the bottom transmission line from the corresponding individual source.

From the foregoing it will be seen that the invention is employed utilizing a central station and a plurality of remote stations, the remote stations all being connected to the central station by a pair of transmission lines. It is pointed out that while the drawings show pairs of transmission lines connecting the remote stations to the central station, it is to be understood that a single conductor may be used employing a common return such as a ground or a metallic conductor.

Further, while the drawings show a capacitive reactance in each of the transmission lines at the input end and an inductive reactance at the output end thereof, it is to be understood that an inductive reactance may be employed at the input end and a capacitive reactance may be employed at the output. An example of a capacitive reactance in the output end may be a condenser-type loud-speaker as the consuming device.

While but one form of the invention has been shown and described herein, it will be readily apparent to those skilled in the art that various minor modifications may be made without departing from the spirit of the invention or the scope of the appended claims.

What is claimed as new and desired to be secured by Letters Patent of the United States is:

1. In a signaling system the combination, with a plurality of transmission lines each having alternating current generator means connected to one end thereof and load means connected to the other end thereof, one of said means being common to all of said transmission lines, said load means including a reactive load connected across one of said transmission lines, of reactive means connected in series with said one of said transmission lines, said reactive means having an impedance of substantially the same order of magnitude as that of said reactive load and of substantially opposite phase, whereby undesirable changes in the flow of energy through the remainder of said lines, in the event of a short circuit in said one line, will be substantially prevented.

2. In a signaling system the combination, with a plurality of transmission lines each having alternating current generator means connected at one end thereof and load means connected to the other end thereof, one of said means being common to all of said transmission lines, said load means including an inductive load connected across one of said transmission lines, of capacitive means connected in series with said one of said transmission lines, said capacitive means having an impedance of substantially the same order of magnitude as that of said inductive load, whereby undesirable changes in the flow of energy through the remainder of said lines, in the event of a short circuit in said one line, will be substantially prevented.

3. The combination according to claim 2, further comprising a source of direct current connectable to said one line at one side of said capacitive means, a direct-current responsive load connected to said one line at the other side of said capacitive means, and inductive means shunting said capacitive means to provide a path for the passage of direct current.

4. The combination according to claim 3, further comprising current limiting resistance means in series with said inductive means and in shunt with said capacitive means.

5. In a signaling system, in combination, a source of alternating current, a plurality of transmission lines connected in parallel across said source, a plurality of reactive loads each connected across a respective one of said lines at a point remote from said source, and reactive impedance means connected in each of said lines in series with the respective load and located at a point close to said source, each of said impedance means having an impedance of substantially the same order of magnitude as the respective load and of substantially opposite phase, whereby undesirable changes in the voltage of said source in the event of a short circuit in any of said lines will be substantially prevented.

6. The combination according to claim 5 wherein at least one of said loads is inductive, said impedance means comprising at least one condenser in series with the respective transmission line.

7. The combination according to claim 6, further comprising a source of direct current connectable to said respective transmission line at one side of said condenser, a direct-current responsive load connectable to said respective transmission line at the other side of said condenser, and a choke coil shunting said condenser to provide a path for the passage of direct current.

8. The combination according to claim 7, further comprising a current limiting resistor in series with said choke coil and in shunt with said condenser.

LEON MARIE VAN DAELE.
JAN JOSEPH BALLET.

REFERENCES CITED

The following references are of record in the file of this patent:

UNITED STATES PATENTS

| Number  | Name   | Date          |
|---------|--------|---------------|
| 484,549 | Brade  | Oct. 18, 1892 |
| 503,321 | Hunter | Aug. 15, 1893 |
| 645,907 | Bedell | Mar. 20, 1900 |